Sept. 25, 1928.　　　　　　　　　　　　　　　　　1,685,682
M. B. ROCK
APPARATUS FOR TEACHING SIGHT SINGING
Filed Nov. 4, 1927　　　3 Sheets-Sheet 1
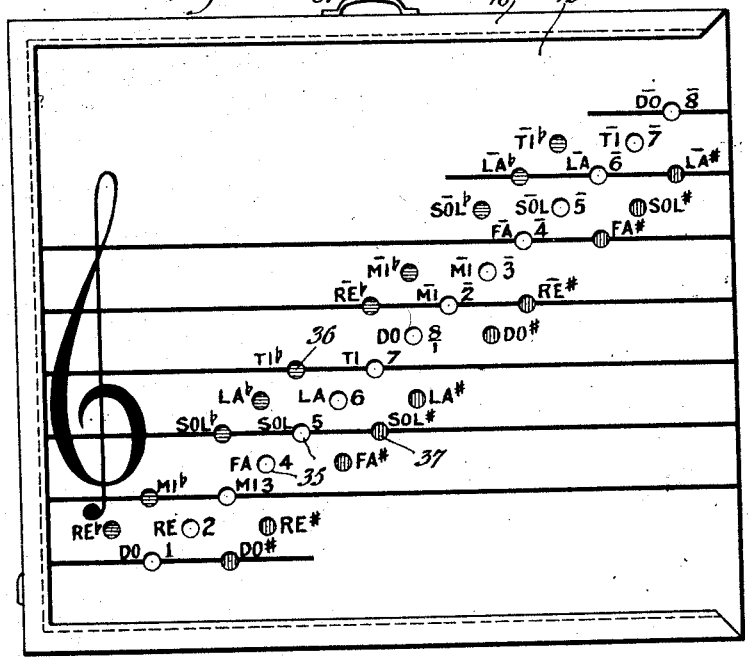

Sept. 25, 1928.  
M. B. ROCK  
1,685,682  
APPARATUS FOR TEACHING SIGHT SINGING  
Filed Nov. 4, 1927  3 Sheets-Sheet 2
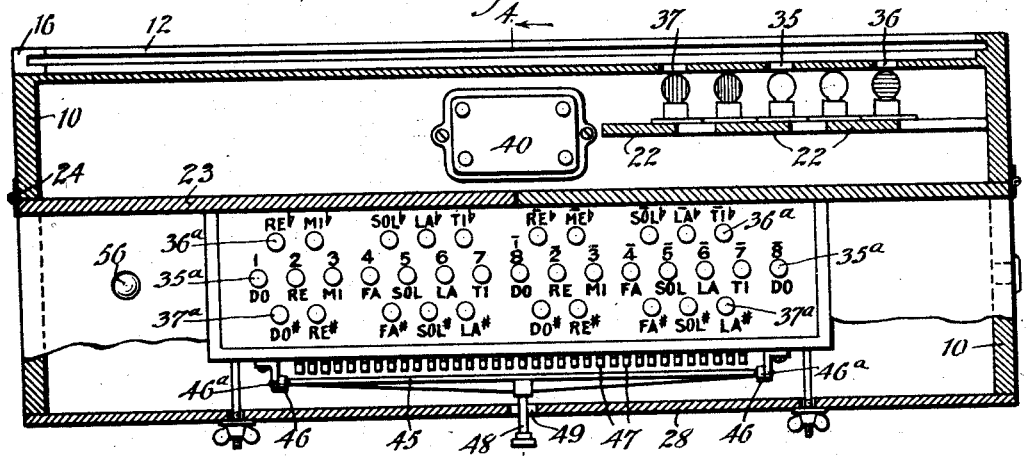
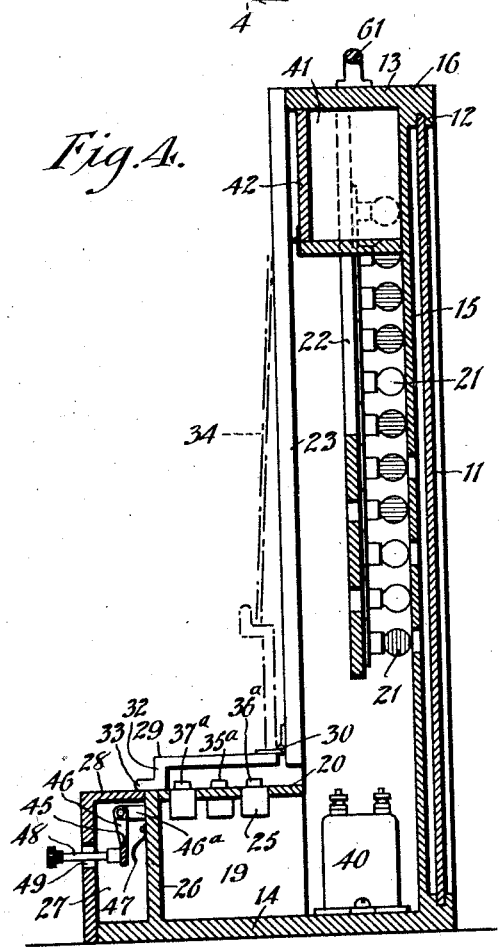
WITNESSES  
INVENTOR  
M. B. Rock  
BY  
ATTORNEY Sept. 25, 1928.

M. B. ROCK 1,685,682

APPARATUS FOR TEACHING SIGHT SINGING

Filed Nov. 4, 1927   3 Sheets-Sheet 3

WITNESSES
Edw. Thorpe
J. J. Foster

INVENTOR
M. B. Rock
BY
Munn & Co.
ATTORNEY

Patented Sept. 25, 1928.

1,685,682

UNITED STATES PATENT OFFICE.

MICHAEL B. ROCK, OF NEW YORK, N. Y.

APPARATUS FOR TEACHING SIGHT SINGING.

Application filed November 4, 1927. Serial No. 231,125.

The present invention is concerned with the provision of a device for facilitating the teaching of music, particularly the teaching of music in schools or in places where a large group of students are to be handled at one time.

The ordinary method of blackboard instruction is a laborious and tedious one for both the pupils and the teacher, and has not proven particularly effective inasmuch as the average child is unable to sing by sight even after prolonged courses in blackboard instruction.

In accordance with the present invention I overcome the inherent defects common to the old method of teaching singing and utilize an apparatus which may be conveniently manipulated by the teacher to display musical notes on a staff board. Preferably the apparatus includes a staff board member provided with a number of lights representing notes on the scale. These lights are controlled by a keyboard manipulated by the teacher and after sounding the fundamental tone the students will quickly learn to sing at sight the notes delineated by the lights flashed on the staff board.

One advantage of this apparatus is that the key-board may be conveniently manipulated by anyone having a superficial familiarity with music and the staff board with its flashing lights will prove sufficiently intriguing to engage the entire attention of the students while the lesson is in progress. The relation of note location to sound is highly accentuated by the apparatus and the students after becoming familiar with the device are able to sing readily a series of notes or a tune by following the flashing lights on the staff board.

Other and more general objects of the invention are to provide an apparatus of this nature which is conveniently portable so that the teacher may carry it about from one classroom to another, an apparatus of simple practical construction which will be rugged, durable and efficient in use, and well suited to the requirements of economical manufacture and convenient manipulation.

With the above noted and other objects in view, the invention consists of certain novel features of construction and combinations and arrangements of parts as will be more fully hereinafter described and pointed out in the claims.

The invention may be more fully understood from the following description in connection with the accompanying drawings wherein—

Figure 1 is a view in front elevation of the apparatus with the cover removed to expose the staff board.

Fig. 2 is a view in rear elevation, with a section of one of the rear doors broken away to expose the interior of the box.

Fig. 3 is a sectional plan view on the line 3—3 of Fig. 2.

Fig. 4 is a vertical sectional view on the line 4—4 of Fig. 3.

Generally speaking, the apparatus includes a housing and a number of signal lamps, which lamps, when lighted, are visible through openings in a staff board at the front of the housing. The rear of the housing may be conveniently opened to gain access to the lamps and lamp sockets for purposes of repair and the lamp controlling keyboard is arranged on a rear extension of the lower end of the box and may be conveniently manipulated by a teacher standing behind the box, the pupils seeing only the staff board and the lights thereon.

Figure 5:
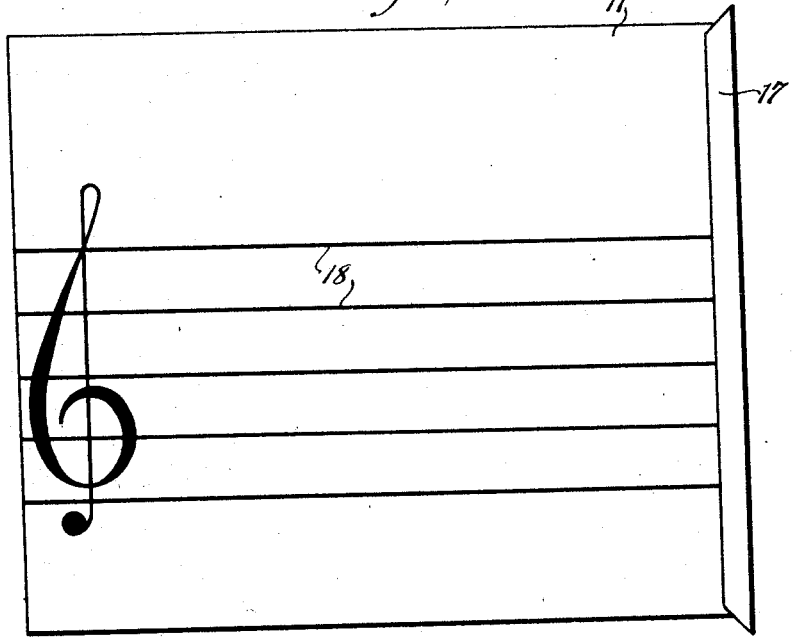
Fig. 5 is a plan view of the inner staff bearing face of the cover.

The box includes a top 13 and bottom 14 connected by vertical side walls 10. The front of the box is in the nature of a sliding cover 11 working in guide grooves 12 in the top and bottom of the box. When this cover is withdrawn as in Fig. 1 the staff board 15 is exposed, this staff board being preferably rigidly connected to the top, bottom and sides of the box and the member 11 being in the nature of a false or protective cover for the staff board. The grooves 12 are formed in inner faces of forwardly projecting rails 16 carried by the top and bottom and one side of the box and a mating rail 17 carried by the sliding cover 11 has a mitre fit with the ends of adjacent rails when the cover is in place. Preferably the sliding cover on its inner face also carries the representation of a staff 18 (Fig. 5) which may prove useful to the instructor and serves as a blackboard if necessary.

The box bottom 14 is rearwardly extended to define the bottom of a switch compartment 19 arranged beneath the keyboard 20 of the device. Compartment 19 communicates directly with the lower end of the main compartment of the box in which the lamps 21 are arranged, these lamps being carried upon diagonally disposed socket supporting slats 22.

The rear wall of the box or rather that portion of the rear wall lying between the box top and the keyboard is formed by a pair of swinging doors 23 hinged as at 24 to the rear edges of the members 10 and when in fully opened position exposing the slats 22 and the wiring for the lamps. The compartment 19 which houses the keyboard switches 25 is closed by a rear wall 26. The wall 26 constitutes the forward wall of a master switch compartment 27, the latter being formed by a wall 26, extended box bottom 14, and a removable switch housing plate 28 of general L shape in cross section and formed at its end with forward extensions lying beside the ends of the keyboard laterally of switch compartment 19.

The keyboard 20 is normally concealed by the use of cover plates 29 hinged at 30 to the lower edges of the swinging doors 23 and carrying at their free edges flanges 32 which space the covers 29 above the keyboard. A rearwardly projecting lip 33 on each flange 32 adapts the cover members 29 for use as a music rack when they are swung to the elevated dotted line position of Fig. 4. In this position I have indicated a sheet of music at 34, the lower edge of which is supported in the corner defined by the flange 32 and lip 33 and the upper edge of which rests against the doors 23.

The staff board 15 in addition to bearing the representation of a musical staff is provided with a series of openings 35 representing the positions of the natural notes of a scale on the staff, this row of openings 35 extending diagonally across the staff board in parallelism with one of the lamp supporting slats 22. Two additional rows of openings 36 and 37 are arranged in parallelism with the row of openings 35. The openings 36 designate the flats of the naturals and the openings 37 designate the sharps. The names of the notes rather than their letter symbols are printed directly beside each of the openings 35, 36, 37, the names being accompanied in the case of flats and sharps by the flat and sharp symbols. The legends on the face of the staff board tend to familiarize a student with the names of the notes at the same time he is learning to associate note positions with tonal sounds.

For purposes which will more fully hereinafter appear, each row of openings exposes a different colored row of lamps. The lamps which shine through the openings 35 and represent natural notes are preferably white. The lamps representing flatted notes are blue, while the lamps representing sharped notes are red. This color scheme may be changed to suit local requirements, but it is preferred because it permits the national colors to be flashed on the staff board when the master switch is thrown in a manner to be later described.

While I do not wish to limit myself in this respect, I preferably make the openings 35, 36 and 37 of sufficient size so that a burnt out lamp may be conveniently removed through them without disturbing the positions of any of the socket bearing members 22.

Each lamp 21 is electrically connected to one of the keys of the keyboard 20. These keys are also arranged in three rows, a row of keys 35$^a$ controlling the lamps for natural notes, keys 36$^a$ controlling the lamps for the flatted notes, and keys 37$^a$ controlling the lamps for the sharped notes. The keys are depressible to close the individual switches 25 and establish an electrical connection through the individual lamps 21. The key legends may be printed either upon the keyboard or upon the keys proper, it being essential of course that the instructor be provided with some identification means for the switch controlling keys.

In order that the apparatus may be entirely self-contained I mount a transformer in the bottom of the box or casing and provide a series of compartments 41 in that portion of the casing which is not occupied by the slats 22. These compartments carry rearwardly opening hinged doors 42 accessible when the box doors 23 have been opened and may be used to store supplies and spare parts for the rapid repair and maintenance of the teaching apparatus.

Housed within the compartment 27 is a master switch including a switch bar 45 carried by a pair of rocker arms 46 pivotally mounted on supporting brackets 46$^a$ projecting rearwardly from the wall 26. The switch bar includes an operating handle 48 projecting rearwardly through an opening 49 in the closure member 28. When the switch bar is swung forwardly by pushing the handle 48 inwardly it simultaneously contacts with a series of spring arms 47 mounted on the wall 26 and serves to effect simultaneous lighting of all of the lamps and the display of the national colors on the staff board. Universal custom directs the singing of the national anthem at the close of each music lesson in the schools and the flashing of the national colors may serve as a signal for the rendition of the anthem by the students.

Figure 6:
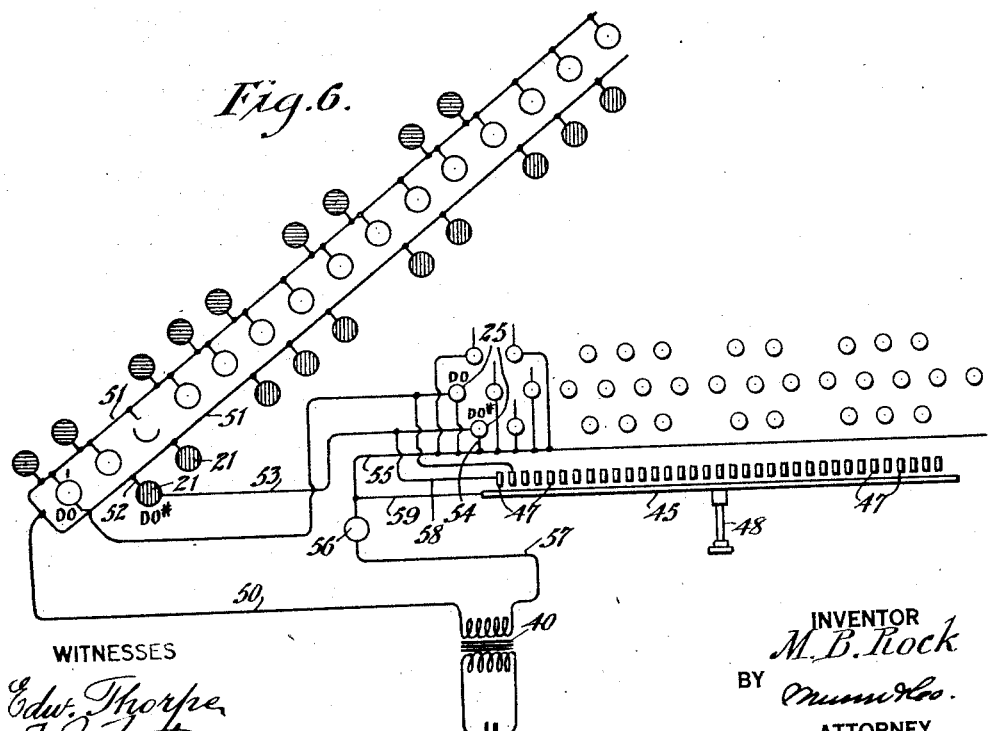
Fig. 6 is a wiring diagram.

With the exception of the main switch 48 the other switch mechanism may be of any convenient or conventional nature and I have therefore not attempted to disclose the details of the switches 25. The manner in which these switches are connected to the transformer, the signal lamps and the main switch, however, is clearly apparent from the wiring diagram wherein I have shown complete circuits for two of the lamps and omitting showing other complete circuits to avoid an unnecessarily complicated drawing. Circuits for the other lamps are identical with the illustrated circuits of the lamps "do" and "do#", shown in Fig. 6. In the diagram a lead wire 50 from one side of the transformer is in circuit with one or more master wires 51 connected to one side of all of the lamps. The "do#" lamp is connected at one side to the master wire 51 through a lead 52 and through its other side directly to the "do#" switch 25 by a lead wire 53. From the switch 25 a lead wire 54 connects to a master lead 56 running through a pilot light 57 back to the other side of the transformer. Thus when the key controlling the "do#" switch 25 is depressed a circuit is completed through the "do#" lamp and pilot light 56. The pilot light partition incidentally is preferably visible at one side of the keyboard, as best seen in Fig. 3. Circuits for the remaining lamps is the same as that described for the "do#" lamp. Each lead wire 53 is connected by an auxiliary lead 58 to one of the spring contacts 47 and the master switch bar 45 is connected by a conductor 59 to the master wire 55, thus when the master switch bar 45 is swung against the contacts 47 a circuit is completed through all of the lamps. This circuit being through leads 53, 58, contacts 47, bar 45 and lead 59, the pilot light being again in circuit.

It is believed that the manner of operating the device will be fully apparent from the foregoing description, but may be briefly described as follows:

The apparatus is set up on a convenient desk or table, the cover 11 removed to expose the staff board to the pupils. The teacher standing behind the apparatus raises the switch board covers 29 supporting a sheet of music as indicated in Fig. 1 and after sounding the fundamental tone and pressing a switch to show the position of the fundamental tone on the staff board may proceed with the lesson, pressing the desired switches and directing the class to sing by sight from the lights which appear on the staff board.

Any suitable means such for instance as the lock 60 may be used for locking the swinging doors 23 and other movable parts of the apparatus and the apparatus may be conveniently transported by the use of the handle 61 on the top of the box.

Obviously various slight changes and alterations may be made in the general form and arrangement of the parts described without departing from the spirit of the invention and hence I do not wish to limit myself to the precise details set forth but shall consider myself at liberty to make such changes and alterations as fairly fall within the spirit and scope of the appended claims.

I claim:

1. An apparatus for teaching sight singing including a casing, a staff board displayed on the front of the casing, lamp bulbs representing notes on the staff board, switches controlling the individual lamps, a key-board arranged on a rearward extension of the casing and including keys for operating said switches.

2. An apparatus for teaching sight singing including a casing, a staff board displayed on the front of the casing, lamp bulbs representing notes on the staff board, switches controlling the individual lamps, a key-board arranged on a rearward extension of the casing and including keys for operating said switches, and a master switch for simultaneously lighting all of said lamps.

3. An apparatus for teaching sight singing including a casing, a staff board displayed on the front of the casing, lamp bulbs representing notes on the staff board, switches controlling the individual lamps, a key-board arranged on a rearward extension of the casing and including keys for operating said switches, and a master switch for simultaneously lighting all of said lamps, the lamps being arranged in three parallel oblique lines across the staff board, the lines representing naturals, sharps and flats, and the respective lines of lamps being colored red, white and blue, whereby the national colors may be flashed on the staff board when the master switch is operated.

4. A portable apparatus for teaching sight singing comprising a casing including top, bottom and side walls, a rearward box-like extension at the lower end of the casing, a keyboard arranged on said extension and including a plurality of switch controlling keys, a staff board at the front of the casing, lamps representing musical notes associated with the staff board and controlled by the switches.

5. A portable apparatus for teaching sight singing comprising a casing including top, bottom and side walls, a rearward box-like extension at the lower end of the casing, a keyboard arranged on said extension and including a plurality of switch controlling keys, a staff board at the front of the casing, lamps representing musical notes associated with the staff board and controlled by the switches, the staff board having openings therein, the lamps being carried on diagonally arranged lamp-supporting slats concealed within the casing and arranged to display the lamps through the openings.

6. A portable apparatus for teaching sight singing comprising a casing including top, bottom and side walls, a rearward box-like extension at the lower end of the casing, a keyboard arranged on said extension and including a plurality of switch controlling keys, a staff board at the front of the casing, lamps representing musical notes associated with the staff board and controlled by the switches, the staff board having openings therein, the lamps being carried on diagonally arranged lamp-supporting slats concealed within the casing and arranged to display the lamps through the openings, there being three rows of openings and lamps representing natural notes, sharp notes and flatted notes of the musical scale.

7. A portable apparatus for teaching sight singing comprising a casing including top, bottom and side walls, a rearward box-like extension at the lower end of the casing, a keyboard arranged on said extension and including a plurality of switch controlling keys, a staff board at the front of the casing, lamps representing musical notes associated with the staff board and controlled by the switches, keyboard cover members hinged to the rear of the box and serving as a music-supporting rack when in upwardly swung position.

8. A portable apparatus for teaching sight singing comprising a casing including top, bottom and side walls, a rearward box-like extension at the lower end of the casing, a keyboard arranged on said extension and including a plurality of switch controlling keys, a staff board at the front of the casing, lamps representing musical notes associated with the staff board and controlled by the switches, doors defining the rear wall of the casing, and a plurality of lamp-bearing devices arranged within the casing and accessible through the doors.

9. A portable apparatus for teaching sight singing comprising a casing including top, bottom and side walls, a rearward box-like extension at the lower end of the casing, a keyboard arranged on said extension and including a plurality of switch controlling keys, a staff board at the front of the casing, lamps representing musical notes associated with the staff board and controlled by the switches, doors defining the rear wall of the casing, and a plurality of lamp-bearing devices arranged within the casing and accessible through the doors, said lamp bearing devices comprising a plurality of parallel diagonally disposed slats carrying lamp sockets.

10. A portable apparatus for teaching sight singing comprising a casing including top, bottom and side walls, a rearward box-like extension at the lower end of the casing, a keyboard arranged on said extension and including a plurality of switch controlling keys, a staff board at the front of the casing, lamps representing musical notes associated with the staff board and controlled by the switches, doors defining the rear wall of the casing, and a plurality of lamp-bearing devices arranged within the casing and accessible through the doors, said lamp bearing devices comprising a plurality of parallel diagonally disposed slats carrying lamp sockets, the casing at one side and above the lower ends of the slats being sub-divided into a plurality of compartments, each having hinged doors accessible upon opening of the rear doors of the casing.

11. A portable apparatus for teaching sight singing comprising a casing including top, bottom and side walls, a rearward box-like extension at the lower end of the casing, a keyboard arranged on said extension and including a plurality of switch controlling keys, a staff board at the front of the casing, lamps representing musical notes associated with the staff board and controlled by the switches, a rearward extension associated with the keyboard and a master switch arranged in said extension for simultaneously lighting all of the lights.

12. A portable apparatus for teaching sight singing comprising a casing including top, bottom and side walls, a rearward box-like extension at the lower end of the casing, a keyboard arranged on said extension and including a plurality of switch controlling keys, a staff board at the front of the casing, lamps representing musical notes associated with the staff board and controlled by the switches, and a sliding cover adapted to conceal the staff board.

13. A portable apparatus for teaching sight singing comprising a casing including top, bottom and side walls, a rearward box-like extension at the lower end of the casing, a keyboard arranged on said extension and including a plurality of switch controlling keys, a staff board at the front of the casing, lamps representing musical notes associated with the staff board and controlled by the switches, and a sliding cover adapted to conceal the staff board, said cover on its inner face bearing the blank representation of a musical staff and being adapted to serve as a blackboard.

Signed at New York, in the county of New York and State of New York, this 28th day of October, A. D. 1927.

MICHAEL B. ROCK.